United States Patent Office 3,160,605
Patented Dec. 8, 1964

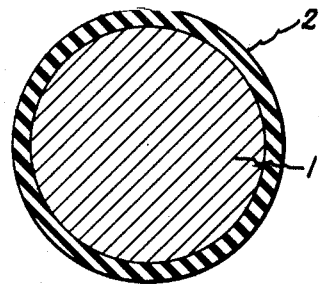

1

3,160,605
POLYMERIC ISOPHTHALATE ESTERS OF HYDROQUINONE AND METHOD OF MAKING THE SAME
Simon W. Kantor, Schenectady, and Fred F. Holub, Scotia, N.Y., assignors to General Electric Company, a corporation of New York
Filed June 1, 1960, Ser. No. 33,131
6 Claims. (Cl. 260—47)

This invention relates to synthetic polymeric compositions, and more particularly to superpolyesters of p-phenylene isophthalate and chloro-substituted-p-phenylene isophthalate having an intrinsic viscosity of at least 0.5 and to a method of making such polymers.

Although superpolyesters are well known in the art, superpolyesters have had to have an aliphatic component in the polymer chain in order for them to be obtained with the high molecular weight characteristic of the superpolyesters. The ordinary resinous esters of a dicarboxylic acid and a dihydric alcohol are polymers having many monomeric units in the polymer molecule, but they still have relatively low molecular weights as compared to the superpolyesters. Because of the longer polymer molecule associated with the higher molecular weights, the superpolyesters have many useful properties not possessed by the corresponding resinous esters; for example, the impact, flexural and tensile strength properties are much greater and furthermore, the films and fibers which can be formed from the superpolyesters can be structurally oriented by cold drawing techniques to produce films and fibers which are much more flexible and have higher strength properties in the direction of orientation than the unoriented products.

It has long been known that aromatic ring compounds are much more stable and have much more desirable high temperature properties than the corresponding aliphatic compounds. Unfortunately, the aromatic compounds usually have correspondingly higher melting points. Therefore, there have been many attempts to prepare polyesters from dihydric phenols and aromatic dicarboxylic acids for use in applications requiring the ability to withstand degradation at elevated temperatures. However, in all attempts the product has been an infusible, insoluble polymer or a very brittle polymer of no utility depending on the particular phenol and acid chosen. The closest approach to obtaining a completely aromatic superpolyester has been to react a dihydric phenol with an alkylene oxide to produce a bis(hydroxyalkoxy)aryl compound. For example, in order to make a superpolyester using hydroquinone, the latter is first reacted with, for example, ethylene oxide to produce 1,4-bis($\beta$-hydroxyethoxy)benzene or a monohydric phenol has been reacted with an aldehyde or ketone to produce various bis(hydroxyphenyl)alkanes. These compounds are esterfied by reaction with a dibasic acid chloride, or by an ester interchange reaction to form the corresponding superpolyester. The alkyl groups in the polymer chain lowered the melting point and increased the solubility sufficiently that either melt or solvent processes could be used for carrying out the reaction. Although such a procedure permitted dihydric phenols and aromatic dicarboxylic acids to be incorporated into superpolyesters, the high temperature stability of the product was sacrificed due to the introduction of the aliphatic groups in the polymeric chain. Any attempt to react a dihydric phenol with a dicarboxylic acid or

2 the ester or acid chloride derivative thereof always resulted in the obtaining of low molecular weight materials which were insoluble and infusible or extremely brittle. The melt process failed because of the fact that even the melting point of the low molecular weight material was so high that thermal decomposition of the polymer always resulted prior to the obtaining of the required high molecular weight material. The ester interchange or the reaction of the acid chloride always failed because of the fact that if carried out in solution the low molecular weight material was precipitated from the solution and was incapable of reacting further to form the high molecular weight material. Attempts to heat the low molecular weight polymer or to carry out the reaction without the use of solvents always failed, again because thermal decomposition took precedence over the formation of the high molecular weight polymer.

Our invention may be better understood by reference to the following description, taken in connection with the drawing, in which:

The sole figure is a cross-sectional view of an insulated electrical conductor within the scope of the present invention.

We have discovered that superpolyesters of p-phenylene isophthalate can be made wherein the p-phenylene radical is selected from the group consisting of p-phenylene, monochloro-p-phenylene and dichloro-p-phenylene radicals and that they can be made with intrinsic viscosities of at least 0.5. Surprisingly, the melting point is at most only slightly higher than the corresponding, lower molecular weight material, but the physical properties are increased tremendously. These superpolyesters have the repeating structural unit

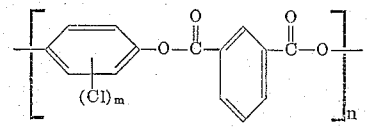

where $m$ is an integer from 0 to 2, inclusive, and $n$ is an integer representing the number of units in the molecule and is at least 10 and for the superpolyesters is probably at least 50. However, intrinsic viscosity is a better measure of molecular weight due to the uncertainties of determining the actual value of $n$, which, at best, is an average value of approximate magnitude.

Intrinsic viscosity is well known in the art and is described in detail in many places in the published literature, for example, on page 309 of the book by P. J. Flory, "Principles of Polymer Chemistry," Cornell University Press, Ithaca, New York, 1953. An intrinsic viscosity of at least 0.5, which in the case of our polymers is measured at 75° C. while dissolved in trichloroacetic acid or 2,4,6-trichlorophenol, is necessary in order for the polymers to be used for making of films and fibers having any utility. Polyesters having intrinsic viscosities below this value lack the necessary properties to form useful films and fibers as indicated by their brittleness which increases as the intrinsic viscosity decreases.

As will be readily apparent from the above structural unit, there can be either p-phenylene isophthalate units or chloro-substituted-p-phenylene isophthalate units or there can be a mixture of both in any polymer molecule. When there is a mixture of both they can appear in ordered, random or block arrangement of each such units. The arrangement and ratio of units will be dependent on the order of reaction and ratio of reactants. For example, if a superpolyester of p-phenylene isophthalate and monochloro-p-phenylene isophthalate is to be made, i.e., a superpolyester formed of p-phenylene isophthalate units and monochloro-p-phenylene isophthalate units, isophthaloyl chloride may be reacted first with hydroquinone and then with chlorohydroquinone, or vice versa, or with a mixture of both, or in separate reactions and then mixed and cocondensed.

The preparation of these superpolyesters is made possible by our discovery that there is a particularly useful group of solvents having the unique property that, although they are not solvents for the polymer at ordinary temperatures, they do become solvents for the completely aromatic polyesters at elevated temperatures, and for the first time permit superpolyesters to be easily prepared from a dihydric phenol and an aromatic dicarboxylic acid when used in the form of the aromatic dicarbonyl halide. Surprisingly enough, not all solvents which are capable of dissolving the resinous polyesters resulting from the reaction are capable of producing the superpolyesters. This unique property appears to be limited to benzophenone, m-terphenyl, chlorinated biphenyls, brominated biphenyls, chlorinated diphenyl oxides and brominated diphenyl oxides.

The function of the above named solvents is twofold; one, it permits a temperature of at least 250° C. to be reached, which is required to provide sufficient condensation to produce the high molecular weights, and at the same time produces a homogeneous solution of the ingredients having a low enough viscosity that heat transfer is high enough to prevent overheating and thermal decomposition of the product. However, these solvents also provide an unidentified function, since not all materials which are capable of dissolving the reactants and polymeric product and have high enough boiling points are useful in our process. For example, such closely related materials as diphenyl sulfone, diphenyl phosphate, o-nitrobiphenyl, 2,3-benzodiphenylene oxide, 4-biphenyl carbonitrile, and anthracene, although they are good solvents for both the starting materials and the reaction products, cannot be substituted for our particular solvents, since they do not permit the obtaining of high molecular weight linear condensation polymers, even though their boiling point is high enough to attain the required high temperature. Materials such as para-phenyl anisole, 4-phenoxy anisole, phenylbenzoate, and so forth, are solvents for some of the completely aromatic polyesters, but are not suitable for use in our process, since the products made in these solvents have low molecular weights. Materials such as diphenyl, diphenyl oxide, o-terphenyl, acenaphthalene, anisole, chlorobenzene, etc., cannot be used since they are not solvents for the high molecular weight, high melting point, polymeric products. As a consequence, as soon as such polymers form, they precipitate as a very low molecular weight material. Solvents containing active hydrogen, such as amines, alcohols, phenols, carboxylic acids, etc., and certain hydrocarbons, cannot be used since they are reactive with the starting materials. Many other materials have too low a boiling point to permit the attainment of the necessary temperature to produce the high molecular weight materials obtainable by our process.

The halogenation of biphenyl and diphenyl oxide usually leads to a mixture of isomers and this is especially true if the amount of halogenating agent reacted exceeds the amount required to produce the monohalogenated product. Insofar as solvents for our process are concerned, it does not matter whether the pure halogenated product or the mixture of isomers is used, or even a mixture of the solvents is used. From a practical standpoint, it is desirable to use the mixture of isomers since the melting point of the mixture is usually lower than the melting point of any of the pure materials of the same halogen content. They are more readily available commercially and the cost is considerably less than that of the pure compound. These mixed isomers are usually designated by their halogen content, e.g., a 50% chlorobiphenyl would have a chlorine content of 50% by weight corresponding to a mixture of tetrachlorobiphenyls. Because they are readily available as a commercial product at a reasonable cost and are excellent solvents for the aromatic polyesters, we prefer to use the chlorinated diphenyl oxides and especially the chlorinated biphenyls. Both of these materials are available as mixtures of isomers with chlorine contents of the mixtures corresponding to mono-, di-, tri-, up to approximately the heptachloro derivatives.

All of our solvents have boiling points greater than 260° C. so that they may be used at atmospheric pressure. However, the use of subatmospheric or superatmospheric pressure is not precluded. For example, reduced pressure can be used in the final stages of the reaction to insure removal of all the hydrogen halide and superatmospheric pressure can be used during the initial stages to prevent loss of the initial reactants. The reaction of dihydric phenols with aromatic dicarbonyl halides while dissolved in this special class of solvents is more particularly described and broadly claimed in our copending application Serial No. 33,124, filed concurrently herewith and assigned to the same assignee as the present invention.

The above method is particularly useful for the production of the linear superpolyesters of p-phenylene isophthalate and the mono- and dichlorosubstituted-p-phenylene isophthalates having an intrinsic viscosity of at least 0.5. Such superpolyesters have been impossible to produce by the prior art processes. These superpolyesters are prepared by the reaction of hydroquinone, monochlorohydroquinone or dichlorohydroquinone with an isophthaloyl halide, e.g., isophthaloyl fluoride, isophthaloyl chloride, isophthaloyl bromide, and isophthaloyl iodide, preferably isophthaloyl chloride while dissolved in one of the above-named solvents.

In general, it is desirable to add the hydroquinone and the isophthaloyl halide to the solvent at room temperature if the solvent is liquid at this temperature, or at or near the melting point if the solvent is a solid at room temperature. The solution is gradually heated to the reaction temperature, care being taken to govern the heating rate so that there is no quick evolution of hydrogen halide which can cause some of the reactants to be erupted from the reaction vessel. Furthermore, since the starting materials would be extremely volatile at the reaction temperature it is desirable that initial reaction take place at a relatively low temperature, so as to form low molecular weight polymers which will not be lost by volatilization from the reaction vessel. On the other hand, the heating rate preferably should not be so slow that the polymer forms and precipitates from the solution because of insolubility at the lower temperature. However, precipitation of the material at this point causes no trouble since the precipitate dissolves readily as the temperature is increased up to the reaction temperature.

The amount of each starting reactant used is preferably within 5 mole percent and more desirably within 3 mole percent of the stoichiometric molar proportions required to produce complete esterification of the reactive groups, e.g., there is from 1 to 1.05, and preferably from 1 to 1.03 phenolic hydroxyls for each carbonyl halide group. The concentration of the reactants should be such that the final concentration of the polyester will be no more than 10 to 15 percent, by weight, of the total weight of the solution. We have found that higher concentrations can be used, but the viscosity of the resulting solution is so high that a film tends to form on the reaction vessel which interferes with good heat transfer and thereby results in some decomposition of the polymer. Under equal conditions, using the same reactants and solvents, we have found that higher intrinsic viscosities are obtained if the reactants are stirred.

By the time that the reaction temperature has reached 270° C., the reaction has usually proceeded to about 90 percent completion and is usually 99 percent complete after about one-half hour at the reaction temperature, as can be easily detected by noting the amount of hydrogen halide evolved. We prefer to use temperatures of from 270° C. up to the reflux temperature of the solution. Usually the temperature is in the range of 290 to 330° C. at atmospheric pressure. The higher boiling solvents and higher reaction temperatures are used for those polymers that are least soluble, e.g., the polymers of p-phenylene isophthalate which tends to prceipitate at temperatures below about 300 to 305° C. Continuing the reaction for 60 to 120 minutes increases the intrinsic viscosity somewhat, but reaction periods longer than this are usually not necessary for obtaining the desired high molecular weights. In fact, in those experiments in which the reaction period was carried out for as long as 8 hours, the intrinsic viscosity was essentially no greater at the end of this time than it was at the end of two hours.

At the end of the reaction time, the source of heat is removed and stirring is continued. As the solution cools, the polymer starts to precipitate in the temperature range of about 200° C. to 300° C. depending on the chemical composition and molecular weight of the polymer and the specific solvent. The polymer may be filtered from the cooled solution but normally we have found it desirable to add a liquid which is a non-solvent for the polymer, but which is miscible with the solvent used in the condensation reaction and which will aid in the filtration process. The particular diluent is not critical. Such materials can be alcohols, ethers, hydrocarbons, or ketones, which are readily available and are easily removed so that the reaction solvent can be reused. The filtered polymer is usually washed several times with such a material to remove all the last traces of the reaction medium. Alternatively, the reaction solvent may be flashed from the polymer, e.g., by spray drying, or evaporated by distillation, e.g., at reduced pressure.

Alternatively, we have found that this superpolyester may be prepared by another but less suitable method, involving the use of the same specific group of solvents. This method involves the ester interchange reaction between a bis(monobasic acid) ester of the desired hydroquinone and isophthalic acid. In this reaction, the isophthalic acid and the diester of hydroquinone, e.g., the diacetate, dipropionate, dibenzoate, etc., ester of hydroquinone are dissolved in the solvent and heated to a temperature in the range of 240° to 350° C. under reflux conditions which allow distillation of the monobasic acid moiety of the hydroquinone diester, e.g., acetic acid if the ester is p-phenylene diacetate (hydroquinone diacetate). In contrast to the 30 to 120 minutes required for the reaction of the acid halide with hydroquinone, the above ester interchange reaction requires an extremely long time, for example, from 6 to 10 hours. The products are dark colored and contain solvent reaction products, especially if the solvent is halogenated. Furthermore, the ester interchange reaction is incapable of removing all of the monobasic acid ester groups and those still remaining in the polymer reduce the high temperature stability of the polymer. The monobasic acid ester groups which are not removed are also a measure of a lower molecular weight since they occupy terminal groups which are potential chain propagating sites. However, this method is capable of producing superpolyesters of p-phenylene isophthalate and mono- and dichloro-p-phenylene terephthalate having an intrinsic viscosity of 0.5 to 0.7. For best products, we prefer to use the reaction of hydroquinone, monochlorohydroquinone or dichlorohydroquinone with isophthaloyl chloride. Such a reaction is capable of producing transparent, water white, tough, strong products having intrinsic viscosities in the range of 0.5 to 2.0 and above.

Other related superpolyesters are disclosed and claimed in our copending applications, filed concurrently herewith and assigned to the same assignee as the present invention.

(1) Linear superpolyesters formed of p-phenylene isophthalate units interspersed with p-phenylene terephthalate units, the intrinsic viscosity of the polyester being at least 0.5 and the p-phenylene isophthalate units being at least 60 mole percent of the total p-phenylene isophthalate and p-phenylene terephthalate units in the superpolyester, disclosed and claimed in our copending application Serial No. 33,125, now U.S. 3,036,990.

(2) Linear superpolyesters formed of p-phenylene isophthalate units interspersed with p,p'-biphenylene isophthalate units, the intrinsic viscosity of the superpolyester being at least 0.5 and the p-phenylene isophthalate units being at least 40 mole percent of the total p-phenylene isophthalate and p,p'-biphenylene isophthalate units in the superpolyester, disclosed and claimed in our copending application Serial No. 33,126, now U.S. 3,036,991.

(3) Chlorine - containing p - phenylene isophthalate, linear superpolyesters having an intrinsic viscosity of at least 0.5 wherein at least 15 mole percent of the isophthalate radicals have from one to two chlorine substituents on the aryl nucleus and the p-phenylene radicals are selected from the group consisting of p-phenylene, monochloro-p-phenylene, and dichloro-p-phenylene radicals, disclosed and claimed in our copending application Serial No. 33,127.

(4) Linear, superpolyesters formed of the four structural units (1) p-phenylene units, (2) units selected from the group consisting of o-phenylene units, m-phenylene units and o,o,'-biphenylene units, (3) isophthalate units, and (4) terephthlate units, the sum of (1), (2), (3) and (4) equalling 100% of the total units of the polymer, the units of (1) being from 25 to 45% of the total units, the units of (2) being from 5 to 25% of the total units, the units of (3) being from 20 to 45% of the total units, the units of (4) being from 5 to 30% of the total units, the units of (1) and (2) forming esters with the units of (3) and (4), the sum of (1) and (2) being from 1 to 1.05 times the sum of (3) and (4) and the sum of (1) and (4) being no greater than 0.7 times the total sum of units, disclosed and claimed in our copending application Serial No. 33,128, now U.S. 3,036,992.

(5) Linear superpolyesters formed of m-phenylene terephthalate units interspersed with from 0 to 30 mole percent of p-phenylene terephthalate units, based on the total m-phenylene terephthalate and p-phenylene terephthalate units, the intrinsic viscosity of said superpolyester being at least 0.5, disclosed and claimed in our copending application Serial No. 33,130.

In order that those skilled in the art may understand our invention, the following examples are given by way of illustration and not by way of limitation.

EXAMPLE 1

A mixture of 1.38 grams of hydroquinone, 2.54 grams of isophthaloyl chloride, and 27 grams of mixed trichlorobiphenyls was heated with stirring. After 2 minutes, a homogeneous solution was obtained, the temperature was 155° C., and the evolution of HCl had started. After 6.5 minutes, the temperature had reached 320° C. and the HCl evolution had slowed down considerably. The resulting refluxing mixture was stirred and heated for an additional 30 minutes at a temperature of 305°–320° C. to yield a viscous, yellow solution. The solution was allowed to cool, thereby precipitating the polymer at a temperature of 265° C. The polymer was separated and washed four times with hot acetone, filtered and allowed to dry by suction. There was obtained 2.75 grams of poly-p-phenylene isophthalate. A sample of this polymer had an intrinsic viscosity of 0.73 in trichloroacetic acid at a temperature of 75° C. Another sample of this polymer was pressed between aluminum foil at 415° C. under a pressure of 2000 lbs./square inch. The pressed film was quenched in ice water immediately upon removal from the press. The resulting film was clear, flexible and tough.

A number of poly-p-phenylene isophthalate polymers were prepared in chlorinated biphenyls and m-terphenyl as solvents. These polymers are listed in Table I. The solvent column includes the chlorine content of the solvents. The third column lists the reaction conditions including times of polymerization and maximum reaction temperatures. All the polymers in Table I were prepared using the general reaction conditions of Example 1. In all cases, pressed films were made which were clear, flexible and tough.

In a similar manner, our polymers may be made substituting benzophenone, brominated biphenyls and brominated diphenyl oxides, as the reaction solvent in place of any of the solvents listed in Table I.

*Table I*

| Solvent | | Reaction Conditions | | Yield, Percent | Intrinsic Viscosity [a] |
|---|---|---|---|---|---|
| Name | Percent Cl | Time, Min. | Temp., °C. | | |
| Dichlorobiphenyls | 32 | 31 | 280–294 | 96.7 | 0.55 |
| Trichlorobiphenyls | 42 | 30 | 305–320 | 91.7 | 0.73 |
| Tetrachlorobiphenyls | 48 | 30 | 310–316 | 97.4 | 0.62 |
| Pentachlorobiphenyls | 54 | 30 | 310–325 | 95.2 | 0.66 |
| Hexachlorobiphenyls | 60 | 30 | 320–325 | 91.7 | 0.61 |
| Heptachlorobiphenyls | 62 | 30 | 320–326 | 92.9 | 0.64 |
| m-Terphenyl | 0 | 30 | 312–315 | 93.1 | [b] 0.57 |

[a] The intrinsic viscosity was measured in trichloroacetic acid at 75° C.
[b] The intrinsic viscosity was measured in 2,4,6-trichlorophenol at 75° C.

EXAMPLE 2

A mixture of 46.75 grams (0.425 mole) of hydroquinone, 86.28 grams (0.425 mole) of redistilled isophthaloyl chloride, and 1200 grams of redistilled mixed dichlorodiphenyl ethers was stirred and heated under nitrogen. After 9.5 minutes the temperature had reached 305° C. The homogeneous solution was heated for 35 minutes at 305° C. to 313° C. The polymer precipitated at 285° C. when the reaction mixture was allowed to cool. The polymer was separated from the solvent, washed five times with 2-liter portions of hot acetone, filtered and dried to give 101.1 grams (99.2%) of poly-p-phenylene isophthalate. This polymer had an intrinsic viscosity of 0.90 in trichloroacetic acid at 75° C. It had a melting point of 408°–416° C. The elementary analysis agreed with the structure $(C_{14}H_8O_4)_x$.

Calculated for $C_{14}H_8O_4$: C, 70.0; H, 3.33. Found: C, 69.7; H, 3.5.

Samples of this polymer were pressed between aluminum foil at 400° C. to 415° C. under 2000 lbs./square inch pressure. The hot films were quenched to room temperature by rapidly placing them in cold water. The resulting quenched films were transparent, quite flexible, tough, and completely amorphous. The density of the amorphous film was 1.335 at 25° C. The tensile strength and elongation of the amorphous film, measured at various temperatures, are tabulated in Table II.

*Table II*

| Temperature, °C. | Tensile Strength, p.s.i. | Elongation Percent |
|---|---|---|
| 25 | 11,560 | 82 |
| 100 | 7,110 | 105 |
| 150 | 5,580 | 135 |
| 200 | 5,690 | 194 |
| 250 | 5,810 | 253 |

Poly-p-phenylene isophthalate undergoes relatively rapid crystallization at 300° C. as evidenced by the appearance of X-ray diffraction lines. The amorphous films exhibit no X-ray diffraction pattern, but the films of poly-p-phenylene isophthalate which have been heated for 75 hours at 300° C. have become crystalline, while remaining transparent. These crystalline films have a density of 1.392 at 25° C. and exhibit a large number of sharp lines in their X-ray diffraction pattern.

Crystalline films of poly-p-phenylene isophthalate may also be prepared by pressing the powder at 400° to 415° C. under pressure and allowing the hot film to cool slowly to room temperature instead of quenching in cold water. These slow-cooled films are translucent to opaque, dependent on the rate of cooling, and exhibit a crystalline X-ray diffraction pattern. These crystalline films are more rigid than the amorphous films prepared by quenching. The films which are cooled the slowest will be the most opaque and brittle.

Fibers of poly-p-phenylene isophthalate have been prepared by drawing fibers from the melt or by extruding the melt through a die to form monofilaments. A quenched extruded fiber is amorphous, and has a density of 1.335. When the amorphous fiber was oriented 240% at 300° C., and allowed to crystallize for one hour at 300° C., it became extremely crystalline, with a density of 1.403 at 25° C. The X-ray diffraction pattern was typical for a fiber and corresponded to an orthorhombic unit cell having the dimensions: $a=6.83$ A., $b=9.53$ A. and $c=48.7$ A.

EXAMPLE 3

By following the directions of Example 2, poly-p-phenylene isophthalate was prepared from 5.50 grams of hydroquinone, 10.15 grams of redistilled isophthaloyl chloride, and 88.0 grams of redistilled mixed pentachlorodiphenyl ethers. The condensation polymerization was carried out for 30 minutes at 340° to 355° C. There was isolated 11.47 grams (95.5%) of poly-p-phenylene isophthalate by using the same work-up procedure as outlined in Example 2. This polymer had an intrinsic viscosity of 0.88 in trichloroacetic acid at 75° C. Amorphous films, crystalline films, amorphous fibers and crystalline fibers were prepared from this polymer, in a similar manner to that described in Example 2.

EXAMPLE 4

This example illustrates the use of chain stoppers to control the molecular weight. A mixture of 5.50 grams of hydroquinone (0.050 mole), 10.15 grams of redistilled isophthaloyl chloride (0.050 mole), the weight of chain stopper indicated in Table III, and 120 grams of redistilled mixed dichlorodiphenyl ethers was stirred and heated under nitrogen. The condensation polymerization was allowed to proceed for 30 minutes at a temperature of 310° to 315° C. The polymer was isolated by cooling the reaction mixture to room temperature and adding one liter of acetone. The polymer was washed 4 times with 1-liter portions of refluxing acetone, filtered and dried to give poly-p-phenylene isophthalate as a free-flowing, white powder. The yield of the polymers and their intrinsic viscosities are indicated in Table III. In all cases, transparent, amorphous, flexible films were prepared by molding the polymers at 400° C. under 2000 lbs./square inch pressure and quenching in cold water.

Table III

| Added Chain-Stopper | | Mole Percent Excess | Yield, Percent | Intrinsic Viscosity [a] |
|---|---|---|---|---|
| Name | Wt., g. | | | |
| Hydroquinone | 0.10 | 1.8 | 98.2 | 0.82 |
| Phenol | 0.06 | 1.25 | 95.0 | 0.81 |
| Do | 0.12 | 2.5 | 94.7 | 0.77 |
| Do | 0.12 | 2.5 | 96.3 | 0.61 |
| Do | 0.24 | 5.0 | 93.8 | 0.49 |

[a] The intrinsic viscosity was measured in trichloroacetic acid at 75° C.

EXAMPLE 5

A mixture of 11.34 grams (0.103 mole) of hydroquinone (3 mole percent excess), 20.30 grams of isophthaloyl chloride (0.10 mole) and 304 grams of redistilled mixed trichlorobiphenyls was stirred and heated under nitrogen. The heating cycle included eight minutes to reach 300° C., followed by a 93-minute heating period at 310° to 330° C. The polymer that was formed was isolated and washed with acetone in a manner similar to that in Example 2. There was obtained 23.75 grams (97.7%) of polymer having an intrinsic viscosity of 0.73 in 2,4,6-trichlorophenol at 75° C. This polymer produced colorless, transparent, flexible, tough films when pressed at 415° C. and 2000 lbs./square inch pressure followed by quenching.

In a similar manner, a polymer was prepared by heating 11.56 grams of hydroquinone (0.105 mole, 5 mole percent excess), 20.30 grams of isophthaloyl chloride (0.100 mole), and 221 grams of redistilled trichlorobiphenyl. This polymerization was carried out for 121 minutes at 320° to 330° C. There was isolated 96.7% yield (23.76 grams) of white polymer having an intrinsic viscosity of 0.52 in 2,4,6-trichlorophenol at 75° C.

Although a 5 mole percent excess of hydroquinone gave a polymer with an intrinsic viscosity above 0.5, it must be emphasized that the real limit, based on amount reacted, is less since some hydroquinone is lost by sublimation and volatilization during the reaction.

EXAMPLE 6

This example shows how closely related chlorinated solvents cannot be used in our process to produce products having the desirable properties of our products.

A mixture of 11.01 grams (0.100 mole) of hydroquinone, 20.30 grams (0.10 mole) of isophthaloyl chloride, and 216 grams of monochlorobenzene was stirred and heated under nitrogen. The HCl which evolved during the reaction was passed into two traps containing a total of 500 ml. of 0.5 N sodium hydroxide solution. The reaction was heated to the reflux temperature of the chlorobenzene, 130° to 132° C. The HCl evolution began at 128° C. and was very slow during the 2 hours of total reaction time. The solution remained homogeneous until 109 minutes of heating time, when the low polymer that was formed started to precipitate from solution. The HCl that was formed was determined by back-titration of the NaOH solution. There was formed a total yield of 17.7% of HCl during the 2 hours of reaction. When the heating period was over the reaction mixture was allowed to cool to room temperature and 500 ml. of acetone was added. This mixture was filtered to recover the acetone insoluble polymer. The filtrate was mixed with 1 liter of methanol to precipitate the acetone soluble-methanol insoluble polymer. The acetone insoluble polymer was washed 3 times with 500 ml. portions of boiling acetone, filtered and dried to give 2.25 grams of polymer, melting at 414° to 420° C. The acetone soluble-methanol insoluble polymer was washed once with 500 ml. of hot methanol, filtered and dried to give 1.95 grams of acetone soluble polymer, melting at 320° to 375° C. The solubility and lower melting point show that this fraction has a lower molecular weight than the acetone insoluble fraction. The total yield of acetone insoluble and acetone soluble polymer was 4.20 grams or 17.5%. The intrinsic viscosity of the higher molecular weight acetone insoluble polymer was 0.11 in 2,4,6-trichlorophenol at 25° C. The acetone insoluble polymer had a chlorine content of 1.08%.

In a similar fashion a mixture of 11.01 grams of hydroquinone, 20.30 grams of isophthaloyl chloride, and 216 grams of o-dichlorobenzene was reacted. The reaction was heated for 19 minutes to reach the reflux temperature of o-dichlorobenzene, and then the reaction mixture was refluxed for an additional 120 minutes at 175° to 178° C. The mixture stayed homogeneous until 75 minutes had elapsed at which point the polymer slowly precipitated from solution. The HCl which was evolved during 139 minutes of reaction was collected in sodium hydroxide traps. There was isolated a total yield of 57.3% of HCl during the entire reaction. The acetone insoluble polymer was isolated in a manner similar to that described for the reaction in chlorobenzene. There was isolated a total of 16.58 grams acetone insoluble polymer, 69.2% yield. The melting point of this polymer was 415° to 420° C. A sample of this polymer had an intrinsic viscosity of 0.16 in 2,4,6-trichlorophenol at 75° C. This polymer had a total chlorine content of 0.91% which is indicative of the acid chloride end groups in this sample. In this experiment, the acetone soluble-methanol insoluble polymer was not formed.

The polymers made in chlorinated benzenes are prepared at relatively lower temperatures which results in incomplete reaction and lower yields. The intrinsic viscosities of the insoluble polymers were low and these polymers did not possess film forming properties.

EXAMPLE 7

This example illustrates that our polymers may be made by an ester interchange reaction, providing one of our particular group of solvents is used. The process is not as desirable, is more time-consuming, and the products are in the lowest acceptable intrinsic viscosity range.

In a 3-neck flask equipped with a stirrer, thermometer and Dean-Stark take-off column, were placed 20.0 grams of p-phenylene diacetate (zone refined, 0.103 mole), 16.61 grams of isophthalic acid (0.100 mole) and 221 grams of redistilled mixed trichlorobiphenyls. The reaction mixture was stirred and heated with a heating mantle. After 17 minutes the reaction temperature reached 290° C. and acetic acid started to distill. The reaction mixture was refluxed at 341 to 345° C. for a total of 5.43 hours. During this time the acetic acid was gradually distilled and was collected. The resulting viscous brown solution was allowed to cool to precipitate the polymer. The acetic acid that was formed was determined by titration with 1 N sodium hydroxide solution. There was obtained a total of 101.4% yield of acetic acid. The polymer that was formed was isolated and washed four times with 1-liter portions of boiling acetone. It was filtered and dried to give 24.23 grams (98.5% yield) of tan polymer. A sample of this polymer had an intrinsic viscosity of 0.50 determined in 2,4,6-trichlorophenol at 75° C. Another sample of polymer was pressed between aluminum foil at 415° C. under a pressure of 2000 lbs./square inch. The resulting quenched film was transparent but brown in color. It was of borderline flexibility.

In a similar manner a total of 19.42 grams of p-phenylene diacetate, 16.61 grams of isophthalic acid and 216 grams of o-dichlorobenzene were reacted. The reaction mixture was refluxed for 256 minutes at 180° C. During this time no acetic acid was formed.

The isophthalic acid stayed out of solution during the reaction and was filtered after the mixture had cooled to 110° C. The acid was washed twice with 200 ml. of cold benzene, filtered and dried by suction to give 16.13 grams (97.2%) of recovered isophthalic acid, melting point 335° to 339° C. The reaction mixture contained no polymer. A sample of the reaction mixture was poured in acetone and remained homogeneous. Another sample of the reaction mixture was poured in methanol and similarly stayed entirely clear.

Similarly, a total of 19.42 grams of p-phenylene diacetate, 16.61 grams of isophthalic acid, and 216 grams of m-cresol were reacted at the reflux temperature of m-cresol, 205° to 206° C. The reaction was refluxed for 260 minutes during which time some acetic acid was formed, but the isophthalic acid had not dissolved so that the reaction mixture was heterogeneous. The reaction mixture was allowed to cool to room temperature and filtered to remove the recovered isophthalic acid. The filtrate contained no polymer which was either acetone- or methanol-insoluble. A total of 13.86 grams (83.5%) of isophthalic acid, melting point 346° to 349° C., was recovered from the reaction mixture.

EXAMPLE 8

A mixture of 14.5 grams (0.10 mole) of monochlorohydroquinone, 20.3 grams (0.10 mole) of redistilled isophthaloyl chloride, and 300.0 grams of redistilled mixed pentachlorobiphenyls was stirred and heated in a nitrogen atmosphere. At 125° C. the reaction mixture became homogeneous and the HCl evolution started at 195° C. A total of 15 minutes was required to get the reaction mixture from room temperature to 349° C., where the solvent was refluxing. The reaction mixture was heated an additional 7 minutes at 345° to 349° C. during which time the solution became quite viscous. When allowed to cool the polymer precipitated at 210° C.; it was isolated by adding about 500 ml. of acetone and filtering. The polymer was washed 3 times with 700 ml. portions of acetone, filtered and dried by suction to give 24.7 grams of white polymeric chloro-p-phenylene isophthalate, melting point 348° to 355° C. A sample of this polymer had an intrinsic viscosity of 0.62 in 2,4,6-trichlorophenol at 75° C.

A one-gram sample of polymer was pressed between aluminum foil at a temperature of 350° C. under a pressure of 1500 lbs./square inch. When the hot film was allowed to cool in air a transparent, flexible, tough film was obtained. Transparent, amorphous films were also obtained when the hot films were allowed to cool in the press at very slow rates, for example, 100 minutes from 350° C. to 190° C. The amorphous film had a density of 1.420 at 25° C. By heating the amorphous film for 20 hours at 275° C., the polymer crystallized and the crystalline film had a density of 1.478 at 25° C., corresponding to a 4.1% increase in density.

A sample of polymeric chloro-p-phenylene isophthalate was analyzed for its elements.

*Analysis.*—calc'd. for $C_{14}H_7ClO_4$: C, 61.3; H, 2.57; Cl, 12.9. Found: C, 61.4; H, 2.5; Cl, 13.7.

EXAMPLE 9

This example illustrates the preparation of a polymer containing both p-phenylene and chloro-p-phenylene units.

A mixture of 1.45 grams (0.010 mole) of resublimed monochlorohydroquinone, 3.30 grams (0.030 mole) of hydroquinone, 8.10 grams (0.040 mole) of redistilled isophthaloyl chloride, and 122.0 grams of distilled, mixed pentachlorobiphenyls, was heated and stirred under nitrogen. After 2 minutes, a homogeneous yellow solution was obtained and the temperature had reached 160° C. The HCl evolution, which was rapid at 160° C., slowed down after 10 minutes when the temperature reached 335° C. The reaction was heated for 8 minutes from 335° to 365° C. and allowed to cool. The polymer, which precipitated at 290° C., was isolated by adding acetone and filtering. The white polymer was washed with acetone, filtered and dried to give 9.5 grams of polymeric p-phenylene-chloro-p-phenylene isophthalate, melting at 392° to 396° C. A sample was pressed between aluminum foil at 375° C. under 500 lbs./sq. in. pressure using 9 mil shims. The resulting film was quenched in cold water to give a transparent, flexible, tough film.

EXAMPLE 10

A mixture of 1.70 grams of a sublimed mixture of isomeric dichlorohydroquinones, 2.00 grams of redistilled isophthaloyl chloride, and 31.0 grams of distilled mixed pentachlorobiphenyls was stirred and heated under nitrogen. A homogeneous reaction mixture was obtained at 110° C. The reaction was heated for 8 minutes in order to reach 340° C. and was then refluxed for 7 minutes at 340° to 345° C. When allowed to cool, the polymer precipitated at 190° C. The polymer was separated from the solvent, washed with 600 ml. of acetone, filtered and dried to give 2.5 grams of white polymeric dichloro-p-phenylene isophthalate, melting at 323° to 328° C. A sample of this polymer was pressed between aluminum foil at 350° C. and 5000 lbs./square inch pressure using 9 mil shims. The hot film was quenched in cold water to give a tan, transparent, flexible film.

EXAMPLE 11

This example illustrates the preparation of a copolymer containing p-phenylene and dichloro-p-phenylene units.

A mixture of 1.70 grams of sublimed hydroquinone, 0.90 gram of a sublimed mixture of isomeric dichlorohydroquinones, 4.05 grams of distilled isophthaloyl chloride, and 35.0 grams of distilled mixed monochlorobiphenyls was stirred and heated under nitrogen. The polymerization was allowed to proceed for 15 minutes at a reflux temperature of 288° C. The resulting viscous solution was allowed to cool whereby the polymer precipitated at 260° C. The polymer was separated and washed 3 times with 500 ml. of acetone, filtered and dried to give 4.4 grams of polymeric p-phenylene-dichloro-p-phenylene isophthalate, melting at 374° to 381° C. A sample of this polymer had an intrinsic viscosity of 0.52 measured in 2,4,6-trichlorophenol at 75° C. A sample of this polymer was pressed at 400° C. and 1000 lbs./square inch pressure between aluminum foil followed by quenching in cold water. The resulting film was colorless, flexible and tough.

EXAMPLE 12

This example shows that the products prepared by interfacial polymerization are not equivalent to the products produced by our process.

A solution of 2.76 grams of hydroquinone in 100 ml. of deaerated water containing 2.0 grams of NaOH was prepared under nitrogen to minimize oxidation. A second solution containing 5.10 grams of isophthaloyl chloride in 240 grams of carbon tetrachloride was poured slowly into the first solution avoiding mixing to form two layers. A polymer film was not formed at the interface, even after standing for 10 minutes under nitrogen. The layers were then vigorously stirred for 45 minutes to form a brown slurry. The mixture was filtered and the insoluble polymer was washed twice with 500 ml. of water and twice with 500 ml. of hot methanol. This light brown polymer had a very low molecular weight and was partly soluble in acetone. It was washed with 500 ml. of acetone to dissolve the lower molecular weight fraction. The higher molecular weight fraction was insoluble in acetone and weighed 2.51 grams (42% yield). This polymer melted at 384° to 397° C. and had an intrinsic viscosity of 0.22 in 2,4,6-trichlorophenol at 75° C. This polymer could not be made to form a film since it carbonized when pressed at 400° C.

Table IV lists a number of other interfacial polymerizations. In all cases, a solution of reactants in column B was added to the solution of column A reactants. The stirring was performed in a Waring blendor and generally temperatures rose to 50° to 75° C. In some cases sodium lauryl sulfate was used as a wetting agent and sodium hydrosulfite was used to prevent the oxidation of hydroquinone by air. The polymers made in the presence of sodium hydrosulfite were lighter in color than those made without oxidation inhibitor. The polymers were isolated by filtration and were washed thoroughly with water and acetone. The polymers had intrinsic viscosities no greater than 0.29 and either did not form films when pressed or formed very brittle films which are entirely unsatisfactory for any practical application.

The monohydric phenol may also be a di- or trihydric phenol in which all but one hydroxyl group has been esterified with an acid, e.g., p-hydroxyphenylbenzoate, p-hydroxyphenyltoluate, m-hydroxyphenylbenzoate, o-hydroxyphenylbenzoate, 5-hydroxyphenylene-1,3 dibenzoate, etc.

In those cases where free hydroxyl groups are desired in the polymer chain, a dihydric phenol, e.g., hydroquinone, resorcinol, etc., may be used as the chain stopping agent.

Table IV

| Polymer | Reactant Solutions | | Polymer | | Remarks |
|---|---|---|---|---|---|
| | A | B | Yield, Percent | η | |
| A | 2.76 grams hydroquinone<br>2.0 grams NaOH 100 ml. H₂O | 5.10 grams isophthaloyl chloride<br>240 grams CCl₄ | 42 | 0.22 | M.P. 384–397° C.; no film. |
| B | 5.50 grams hydroquinone<br>4.0 grams NaOH<br>3.0 grams sodium lauryl sulfate<br>300 ml. H₂O | 10.15 grams isophthaloyl chloride<br>150 ml. s-tetrachloroethane | 99.9 | 0.23 | Brown powder, no film. |
| C | 5.50 grams hydroquinone<br>4.0 grams NaOH<br>3.0 grams sodium lauryl sulfate<br>0.10 gram sodium hydrosulfite<br>300 ml. H₂O | 10.15 grams isophthaloyl chloride<br>150 ml. s-tetrachloroethane | 70.5 | 0.23 | Light tan powder; no film. |
| D | 5.50 grams hydroquinone<br>4.0 grams NaOH<br>1.0 gram sodium lauryl sulfate<br>0.1 gram sodium hydrosulfite<br>250 ml. H₂O | 10.15 grams isophthaloyl chloride<br>150 ml. s-tetrachloroethane | 53.9 | 0.20 | Light tan powder; no film. |
| E | 5.50 grams hydroquinone<br>4.0 grams NaOH<br>0.50 gram sodium lauryl sulfate<br>0.10 gram sodium hydrosulfite<br>250 ml. H₂O | 10.15 grams isophthaloyl chloride<br>150 ml. dimethylsulfolane | 82.7 | 0.18 | Light tan powder; no film. |
| F | 5.50 grams hydroquinone<br>10.10 grams triethylamine<br>200 ml. dimethylsulfolane | 10.15 grams isophthaloyl chloride<br>150 ml. dimethylsulfolane | 77.2 | 0.15 | Off-white powder; no film. |
| G | 5.50 grams hydroquinone<br>4.00 grams NaOH<br>0.50 gram sodium lauryl sulfate<br>0.10 gram sodium hydrosulfite<br>300 ml. H₂O | 10.15 grams isophthaloyl chloride<br>150 ml. trichlorobiphenyl | 91.7 | 0.29 | Tan powder; brittle film. |
| H | 5.50 grams hydroquinone<br>10.15 grams isophthaloyl chloride<br>350 ml. s-tetrachloroethane | 11.11 grams triethylamine | 93.7 | 0.22<br>0.24 | Off-white powder; brittle film. |
| I | 1.10 grams hydroquinone<br>2.03 grams isophthaloyl chloride<br>70.0 ml. hexamethylphosphoramide | 2.22 grams triethylamine | 0 | | |
| J | 1.10 grams hydroquinone<br>2.03 grams isophthaloyl chloride<br>350 ml. s-tetrachloroethane | 2.22 grams triethylamine | 79.3 | 0.22 | Off-white powder; no film. |

As the Example 4 has illustrated, if it is desired to modify the molecular weight of our linear polyesters, chain stopping agents such as one or more monohydric phenols or one or more monobasic acid chlorides may be added in minor amounts, e.g., 0.1 to 1% of the corresponding difunctional compound may be added along with the other ingredients, during the condensation reaction, or after the main condensation reaction is completed. Examples of monohydric phenols which may be added are phenol itself, the cresols, e.g., ortho-, meta-, and para-cresol, the xylenols, e.g., 2,3-xylenol, 2,4-xylenol, 2,5-xylenol, 2,6-xylenol, 3,5-xylenol, etc., the hydrocarbons and hydrocarbonoxy-substituted phenols, e.g., ethylphenol, propylphenol, isopropylphenol, butylphenol, tertiary butylphenol, amylphenol, the phenylphenols, naphthylphenols, the phenoxyphenols, the methoxyphenols, ethoxyphenols, phenoxyphenols, etc., including all of those phenols in which one or more of the hydrogen atoms attached to the aryl nucleus are replaced by a halogen atom such as fluorine, chlorine, bromine, or iodine, e.g., the mono-, di-, tri-, tetra- and pentachlorophenols, the mono-, di-, tri-, tetra- and pentabromophenols, the mono-, di-, tri-, tetra-, and pentaiodophenols, the mono-, di-, tri-, tetra- and pentafluorophenols, the mono-, di-, tri-, tetrachlorocresols, and the mono-, di-, tri-, chloroxylenols, etc.

Monobasic acid halides which may be used are the acid halides of the aromatic series such as benzoyl chloride, benzoyl bromide, benzoyl iodide, toluoyl chloride, naphthoyl chloride, biphenylcarbonyl chloride, etc., including halogenated derivatives thereof. Although monobasic acid halides of the aliphatic series may be used, we prefer not to use them, since they destroy the high temperature stability of the polymers. For the same reason, we prefer that the esters of the di- and trihydric phenols be aromatic monocarboxylic acid esters and that, if substituted, the substituent grouping be chlorine.

The dichlorohydroquinones useful in making our superpolyesters may be any of various isomers or mixtures thereof. For example, the 2,3-, 2,5- or 2,6-dichlorohydroquinones. There is only one monochlorohydroquinone. It is sometimes referred to as chlorohydroquinone. Because the exact position of the chlorine atoms does not affect the desirable properties of our superpolyesters we have found that the commercially available dichlorohydroquinone which is essentially a mixture of the 2,3- and 2,5-dichloro-isomers in which the latter predominates, is completely satisfactory as a reactant, but may be resublimed if a lighter color is desired in the product.

In making the copolymers of our invention, the proportions of the hydroquinone, monochlorohydroquinone and dichlorohydroquinone can be varied over the full range from 100% of any one up to mixtures in any proportions of any or all of them as the dihydric phenol reactant, to produce a wide variety of superpolyesters having many useful and interesting properties as the examples have illustrated.

The superpolyesters of this invention are suitable for a wide variety of uses. As coating compositions they may be coated onto metallic or non-metallic substrates by flame spraying, melt casting, or by casting while dissolved in one of the solvents in which it is made, and thereafter evaporating the solvent at an elevated temperature and at reduced pressure. The hot solution of the solvent may be forced through a spinneret into a heated drying tower, preferably maintained at reduced pressure to form filaments and fibers, or the molten polymer may be forced through spinnerets by well known techniques to form filaments and fibers. In both cases the formed filament may be cold drawn to structurally orient the polymer in the direction of the fiber axis to increase the tensile strength. The fibers so formed may be formed into yarns or used to form fiber matting. Alternatively, the superpolyesters may be cast from solution or from the melt of the polymer, extruded through a die, or otherwise sheeted to form a continuous film of the superpolyester. These films may be oriented by cold drawing in either one or both of their major dimensions, to orient the polymer molecules in the plane of the film. For best properties, it is well to form a balanced film by orienting in both directions. It is to be understood that the cold drawing of either the film or fiber involves any stretching and/or rolling of the film below the melting point of the polymer. Preferably, the cold drawing is done above the second order transition temperature of the polymer. The amount of stretching and/or rolling is usually sufficient to increase the dimensions to at least twice the original length in the case of fibers, and to twice the surface area of the plane in the case of a film. The oriented film is heat-set between 200°–350° C. but preferably 275°–350° C. while maintained under tension. As the examples have illustrated, the crystalline products formed by heat and pressure and allowed to cool slowly are opaque and rigid. If, instead of allowing an object to cool slowly, it is cooled rapidly, for example by quenching in cold water or in a blast of cold air, the material is transparent and amorphous. The rapidity with which these products must be cooled to prevent them from being opaque is dependent on their composition. The p-phenylene isophthalate requires a quick quench as by immersing in water, while monochloro-p-phenylene isophthalate may be allowed to cool in air at room temperature. Copolyesters containing both of these two ingredients will require treatment intermediate between these two extremes to produce the clear amorphous state. If this amorphous material is heated above its second-order transition point, but below its softening point, e.g., to a temperature in the range of 200°–350° C., but preferably 275°–350° C., the amorhpous state is unstable and the film crystallizes. However, in contrast to the crystalline state obtained by slow cooling of the film from the molding temperature, the film remains clear and flexible. The effect of this crystallization is to cause the density of the polymer to increase and for the actual physical dimensions to decrease. This same effect would be noticed if the polymer was extruded in the form of tubing and quenched. This shrinkage can be utilized to advantage, for example, in the preparation of an insulated electrical conductor shown in the drawing. In the case of the film, electrical conductor 1 is wound with the film in the form of a tape in a spiral fashion with either the adjacent edges abutting each other or overlapping to produce insulating layer 2. In the case of tubing, the tubing is slipped onto electrical conductor 1 to provide insulation layer 2. In both cases, the film or tubing is shrunk tightly onto electrical conductor 1 by heating insulating layer 2 to a temperature in the range of 200°–350° C. but preferably 275–350° C.

Other uses for our films and the fabrics or mats made from the fibers include a wide variety of electrical applications, that is, as a dielectric, for example, as a dielectric in capacitors, as slot insulation for motors, primary insulation for heat-resistant wire, pressure-sensitive electrical tape, split mica insulating tape, i.e., mica sheet laminated between film, small condensers, metal foil laminated too film or film having an adherent metal coating, weather resistant electrical wire, i.e., a conductor wrapped with film coated with asphalt, as a wrapping for submerged pipe to insulate against ground currents, as primary and secondary insulation in transformer construction, as a dielectric in electroluminescent structures, etc. They may also be used to laminate or adhere glass and metal surfaces to themselves, to each other or to a like surface. Two mating glass objects may be heat-sealed vacuum-tight by inserting an interlayer of the superpolyester either as a powder, as a film, or as a surface coating between two glass surfaces to be formed. Pressure or vacuum is applied to the assembly after it is heated to the softening point of the superpolyester to firmly adhere the two glass surfaces together. This process may be used for forming vacuum-tight seals between two mating glass surfaces, such as for making a cathode ray tube and other devices, as disclosed and claimed in Day et al. application Serial No. 33,129, filed concurrently herewith and assigned to the same assignee as the present invention.

Other valuable uses for the superpolyester of p-phenylene isophthalate will be readily apparent to those skilled in the art. Also, many apparently widely different embodiments such as the adding of pigments, fillers, stabilizers, plasticizers, etc., may be made to modify the properties of the polymers without departing from the spirit and scope of the invention. It is therefore to be understood that changes may be made in the particular embodiments of the invention described which are within the full intended scope of the invention as defined by the appended claims.

What we claim as new and desire to secure by Letters Patent of the United States is:

1. The process of producing a p-phenylene isophthalate superpolyester which comprises reacting a mixture of reactants consisting essentially of a dihydric phenol selected from the group consisting of hydroquinone, monochlorohydroquinone and dichlorohydroquinone and an isophthaloyl halide, the isophthaloyl radical of said isophthaloyl halide having the formula

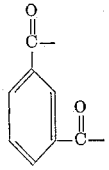

while the reactants are dissolved in a solvent selected from the group consisting of benzophenone, m-terphenyl, chlorinated biphenyl, brominated biphenyl, chlorinated diphenyl oxide and brominated diphenyl oxide at a temperature in the range of about 270° C. up to the reflux temperature of the solution until at least the evolution of the hydrogen halide substantially ceases, by which time the superpolyester has an intrinsic viscosity of 0.5 measured at 75° C., and isolating the solid polymer from the reaction mixture.

2. The process of claim 1 wherein the isophthaloyl halide is isophthaloyl chloride.

3. The process of claim 1 wherein the dihydric phenol is hydroquinone.

4. The process of claim 1 wherein the dihydric phenol is hydroquinone, the isophthaloyl halide is isophthaloyl chloride and the solvent is chlorinated biphenyl.

5. A linear superpolyester made by the process of claim 1, consisting essentially of a p-phenylene isophthalate having an intrinsic viscosity of at least 0.5 measured at 75° C., wherein the p-phenylene radicals of the said p-phenylene isophthalate are selected from the group consisting of p-phenylene, monochloro-p-phenylene and dichloro-p-phenylene radicals and mixtures of said radicals and the isophthalate radical of said p-phenylene isophthalate is the isophthalate radical

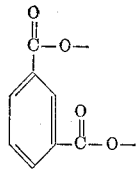

6. An insulated electrical conductor comprising an electrical conductor having on its surface a linear superpolyester made by the process of claim 1, consisting essentially of a p-phenylene isophthalate having an intrinsic viscosity of at least 0.5 measured at 75° C., wherein the p-phenylene radicals of said p-phenylene isophthalate are selected from the group consisting of p-phenylene, monochloro-p-phenylene, dichloro-p-phenylene radicals and mixtures of said radicals and the isophthalate radical of said p-phenylene isophthalate is the isophthalate radical

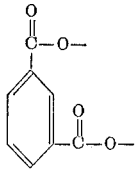

References Cited by the Examiner

UNITED STATES PATENTS 2,595,343 5/52 Drewitt et al. _____ 260—47
2,954,355 9/60 Young et al. _____ 260—75

FOREIGN PATENTS 1,175,362 11/58 France.
553,841 6/57 Belgium.

WILLIAM H. SHORT, *Primary Examiner.*

H. N. BURSTEIN, P. E. MANGAN, *Examiners.*